United States Patent
Guggenheim et al.

(10) Patent No.: US 10,584,210 B2
(45) Date of Patent: Mar. 10, 2020

(54) POLYETHERIMIDE WITH IMPROVED COLOR, AND METHODS OF MANUFACTURE THEREOF

(71) Applicant: SABIC GLOBAL TECHNOLOGIES B.V., Bergen Op Zoom (NL)

(72) Inventors: Thomas Guggenheim, Mt. Vernon, IN (US); Juan Rodriguez Ordonez, Murcia (ES); Javier Nieves Remacha, Madrid (ES); Jose Roman Galdamez Pena, Madrid (ES); Hareesh Shamrao Deshpande, Bangalore (IN); Sunil S. Dhumal, Maharashtra (IN); Surya Prakasa Rao Daliparthi, Karnataka (IN); Srinivas Mahesh Kumar, Bangalore (IN); Sivakumar P., Karnataka (IN); Siva Kumar Sreeramagiri, Bangalore (IN); Carmen Rocío Misiego Arpa, Cartagena (ES); Carlos Sanjuan Fernandez, Murcia (ES); Bernabe Quevedo Sanchez, Murcia (ES)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 92 days.

(21) Appl. No.: 15/553,749

(22) PCT Filed: Feb. 26, 2016

(86) PCT No.: PCT/US2016/019797
§ 371 (c)(1),
(2) Date: Aug. 25, 2017

(87) PCT Pub. No.: WO2016/138391
PCT Pub. Date: Sep. 1, 2016

(65) Prior Publication Data
US 2018/0037699 A1 Feb. 8, 2018

(30) Foreign Application Priority Data
Feb. 27, 2015 (EP) .................................... 15382089

(51) Int. Cl.
*C08G 73/10* (2006.01)

(52) U.S. Cl.
CPC ..... *C08G 73/1053* (2013.01); *C08G 73/1046* (2013.01)

(58) Field of Classification Search
CPC .... C08G 73/107; C08G 73/1003; C08G 8/02; C07C 37/66; C07G 1/02; C07D 401/00
See application file for complete search history.

(56) References Cited

U.S. PATENT DOCUMENTS

| | | |
|---|---|---|
| 4,276,232 A | 6/1981 | Rasberger |
| 4,330,666 A | 5/1982 | White et al. |
| 4,520,204 A | 5/1985 | Evans |
| 4,988,544 A | 1/1991 | Cella et al. |
| 5,229,482 A | 7/1993 | Brunelle |
| 5,290,945 A | 3/1994 | Roy et al. |
| 5,608,027 A | 3/1997 | Crosby et al. |
| 6,235,866 B1 | 5/2001 | Khouri et al. |
| 6,265,521 B1 | 7/2001 | Fyvie et al. |
| 6,753,365 B2 | 6/2004 | Brown et al. |
| 6,790,934 B2 | 9/2004 | Johnson et al. |
| 6,919,418 B2 | 7/2005 | Khouri et al. |
| 7,842,824 B2 | 11/2010 | Mikami et al. |
| 8,080,671 B2 | 12/2011 | Guggenheim et al. |
| 8,299,204 B2 | 10/2012 | Germroth et al. |
| 8,354,491 B2 | 1/2013 | Crawford et al. |
| 8,372,941 B2 | 2/2013 | Bernabe et al. |
| 2003/0225194 A1 | 12/2003 | Coffy et al. |
| 2007/0225479 A1 | 9/2007 | Silvi et al. |
| 2008/0262196 A1 | 10/2008 | Giammattei et al. |
| 2009/0163691 A1 | 6/2009 | Bernabe et al. |
| 2009/0292128 A1 | 11/2009 | Guggenheim et al. |
| 2011/0263760 A1 | 10/2011 | Jakupca et al. |
| 2011/0263791 A1 | 10/2011 | Chiong et al. |
| 2013/0260125 A1* | 10/2013 | Ordonez ................. C08L 79/08 428/220 |
| 2013/0344313 A1* | 12/2013 | Ordonez ............. C08G 73/101 428/220 |
| 2014/0094535 A1 | 4/2014 | Guggenheim et al. |
| 2014/0099510 A1 | 4/2014 | Chiong et al. |
| 2018/0044474 A1 | 2/2018 | Guggenheim et al. |
| 2018/0127546 A1 | 5/2018 | Guggenheim et al. |

FOREIGN PATENT DOCUMENTS

| | | |
|---|---|---|
| EP | 2644640 A1 | 10/2013 |
| EP | 2644641 A1 | 10/2013 |
| GB | 2280183 A | 1/1995 |
| WO | 2009143440 A1 | 11/2009 |

OTHER PUBLICATIONS

International Search Report for International Application No. PCT/US2016/019797, Inernational Filing Date Feb. 26, 2016, dated Aug. 11, 2016, 5 pages.

Written Opinion for International Application No. PCT/US2016/019797, Inernational Filing Date Feb. 26, 2016, dated Aug. 11, 2016, 10 pages.

* cited by examiner

*Primary Examiner* — Shane Fang
(74) *Attorney, Agent, or Firm* — Cantor Colburn LLP

(57) ABSTRACT

A method of preparing a polyetherimide and an improved polyetherimide are disclosed. Low color polyetherimides are disclosed along with process improvements which produce the reduced color of the final product polymers.

12 Claims, No Drawings

POLYETHERIMIDE WITH IMPROVED COLOR, AND METHODS OF MANUFACTURE THEREOF

CROSS REFERENCE TO RELATED APPLICATIONS

This application is a National Stage application of PCT/US16/19797, filed Feb. 26, 2016, which claims the benefit of European Application No. 15382089.9, filed Feb. 27, 2015, both of which are incorporated by reference in their entirety herein.

BACKGROUND

To meet the increased demand for polyetherimide, the "displacement polymerization" process has been developed. Synthesis of polyetherimides via the displacement polymerization process includes imidization as described, for example, in U.S. Pat. No. 6,235,866), to produce a bisphthalimide substituted with a leaving group; synthesis of a salt of a dihydroxy aromatic compound, as described, for example, in U.S. Pat. No. 4,520,204; and polymerization by reacting the substituted bisphthalimide and the salt ("displacement"), as described, for example, in U.S. Pat. No. 6,265,521, followed by downstream activities.

In particular, imidization generally proceeds by reaction of 2 moles of a phthalic anhydride substituted with a leaving group with 1 mole of diamine in a reaction solvent, such as ortho-dichlorobenzene (ODCB) to provide a bis(phthalimide) substituted with two leaving groups. In a specific embodiment, the substituted phthalic anhydride is 4-chlorophthalic anhydride, the diamine is meta-phenylene diamine, and the bisphthalimide is a bis(chlorophthalimide) (ClPAMI). When 3-chlorophthalic anhydride (3-ClPA) and 4,4-diaminodiphenyl sulfone (DDS) are used, the product is 4,4'-bis(phenyl-3-chlorophthalimide)sulfone (DDS ClPAMI)). The bis(phthalimide) polymerizes with bisphenol A disodium salt (BPANa2) to provide the polyetherimide via chloro-displacement in the presence of a phase transfer catalyst, such as hexaethylguanidinium chloride.

There nonetheless remains an ongoing, unmet need for polyetherimides having improved color properties, and methods of making such polyetherimides.

SUMMARY

A method is disclosed for the manufacture of a polyetherimide composition, the method comprising: contacting a halophthalic anhydride having the formula

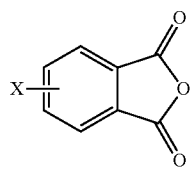

with an organic diamine having the formula H$_2$N—R—NH$_2$, to form a bis(halophthalimide) having the formula,

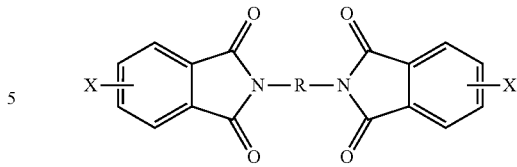

wherein the molar ratio of the halophthalic anhydride relative to the organic diamine is 2:1 to 2.1:1; and contacting the bis(halophthalimide) with an alkali metal salt of a dihydroxy aromatic compound having the formula MO-Z-OM to form the polyetherimide comprising the structural units having the formula

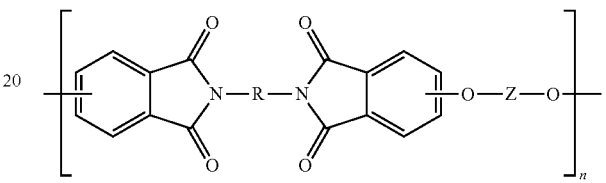

wherein in the foregoing formulae, X is fluoro, chloro, bromo, iodo, or a combination thereof; each R is independently the same or different, and is a substituted or unsubstituted $C_{6-20}$ aromatic hydrocarbon group, a substituted or unsubstituted straight or branched chain $C_{2-20}$ alkylene group, a substituted or unsubstituted $C_{3-8}$ cycloalkylene group, or a combination thereof; M is an alkali metal; Z is an aromatic $C_{6-24}$ monocyclic or polycyclic moiety optionally substituted with 1 to 6 $C_{1-8}$ alkyl groups, 1 to 8 halogen atoms, or a combination thereof; and n is an integer greater than 1, preferably 2 to 1000, or 5 to 500, or 10 to 100; wherein the polyetherimide has a Yellowness Index of less than 93.

A method is disclosed for the manufacture of a polyetherimide composition, the method comprising: reacting a halophthalic anhydride having the formula

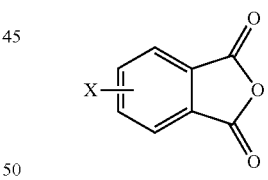

with an organic diamine having the formula

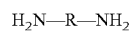

at a temperature of less than 180° C. to form a bis(halophthalimide) having the formula

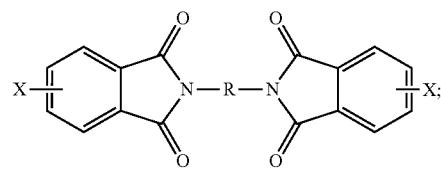

and contacting the bis(halophthalimide) with an alkali metal salt of a dihydroxy aromatic compound having the formula

MO-Z-OM to form the polyetherimide comprising the structural units having the formula

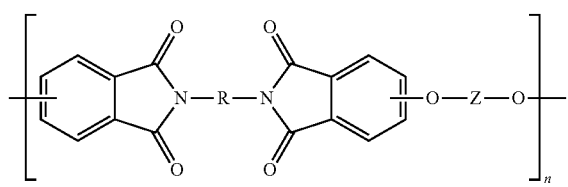

wherein in the foregoing formulae, X is fluoro, chloro, bromo, iodo, or a combination thereof; each R is independently the same or different, and is a substituted or unsubstituted $C_{6-20}$ aromatic hydrocarbon group, a substituted or unsubstituted straight or branched chain $C_{2-20}$ alkylene group, a substituted or unsubstituted $C_{3-8}$ cycloalkylene group; Z is an aromatic $C_{6-24}$ monocyclic or polycyclic moiety optionally substituted with 1 to 6 $C_{1-8}$ alkyl groups, 1 to 8 halogen atoms, or a combination thereof; and n is an integer greater than 1, preferably 2 to 1000, or 5 to 500, or 10 to 100; wherein the polyetherimide has a Yellowness Index of less than 93.

Also disclosed is a method for the manufacture of a polyetherimide composition, the method comprising: reacting a halophthalic anhydride having the formula

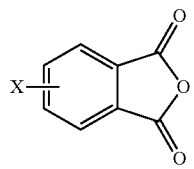

and containing less than 0.02% of residual halophthalide, preferably chlorophthalides with an organic diamine having the formula

H$_2$N—R—NH$_2$ to provide a solution wherein the molar ratio of the halophthalic anhydride to the organic diamine is 2:1 to 2.1:1; degassing the solution with an inert gas; and heating the solution to a temperature of less than 180° C. to form a bis(halophthalimide) having the formula

and
contacting the bis(halophthalimide) with an alkali metal salt of a dihydroxy aromatic compound having the formula

MO-Z-OM in the presence of hexaethylguanidinium chloride catalyst, wherein hexaethylguanidinium chloride is in contact with the bis(halopthalimide) before the polymerization starts for a time and temperature selected from: less than 60 minutes at 180° C.; less than 180 minutes when reacting the halophthalic anhydride with the diorganic amine at temperature of less than 170° C.; less than 20 hours when reacting the halophthalic anhydride with the diorganic amine at temperature of 130° C. to 160° C.; to form the polyetherimide comprising the structural units having the formula

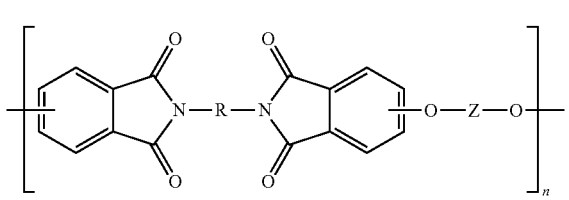

wherein in the foregoing formulae, X is fluoro, chloro, bromo, iodo, nitro, or a combination thereof; each R is independently the same or different, and is a substituted or unsubstituted $C_{6-20}$ aromatic hydrocarbon group, a substituted or unsubstituted straight or branched chain $C_{2-20}$ alkylene group, a substituted or unsubstituted $C_{3-8}$ cycloalkylene group, or a combination thereof; and n is an integer greater than 1, preferably 2 to 1000, or 5 to 500, or 10 to 100; wherein the polyetherimide has a Yellowness Index of less than 93.

Also disclosed is a method for the manufacture of a polyetherimide composition, the method comprising reacting a halophthalic anhydride having the formula

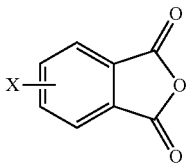

with an organic diamine having the formula H$_2$N—R—NH$_2$ at a temperature of less than 180° C. to form a bis(halophthalimide) having the formula

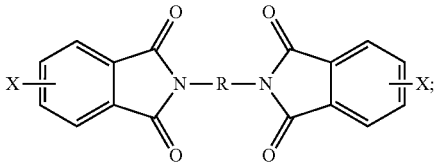

and
contacting the bis(halophthalimide) with an alkali metal salt of a dihydroxy aromatic compound having the formula MO-Z-OM, and after the addition of the alkali metal salt is complete forming a polymerizable mixture; adding hexaethylguanidinium chloride catalyst to the polymerizable mixture to form the polyetherimide comprising the structural units having the formula

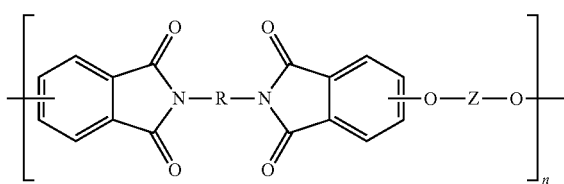

wherein in the foregoing formulae X is fluoro, chloro, bromo, iodo, or a combination thereof; each R is independently the same or different, and is a substituted or unsubstituted $C_{6-20}$ aromatic hydrocarbon group, a substituted or unsubstituted straight or branched chain $C_{2-20}$ alkylene group, a substituted or unsubstituted $C_{3-8}$ cycloalkylene group, or a combination thereof; M is an alkali metal; Z is an aromatic $C_{6-24}$ monocyclic or polycyclic moiety optionally substituted with 1 to 6 $C_{1-8}$ alkyl groups, 1 to 8 halogen atoms, or a combination thereof; and n is an integer greater than 1, preferably 2 to 1000, or 5 to 500, or 10 to 100; wherein the polyetherimide has a Yellowness Index of less than 93.

These and other features, aspects, and advantages will become better understood with reference to the following description and appended claims.

DETAILED DESCRIPTION

The inventors hereof have developed methods and compositions to improve the color quality (measured as Yellowness Index) of a polyetherimide made by the chloro-displacement route. High color polymer requires more pigments and dyes to meet many color specifications, and the addition of excess colorants can result in loss of other polymer physical properties. A low base polymer is therefore advantageous.

In an embodiment, the imidization composition comprises no detectable amount of a sodium aryl phosphinate salt. In an embodiment, the polyetherimide composition comprises no detectable amount of a sodium aryl phosphinate salt.

In an aspect, the solution of halophthalic anhydride and organic diamine is degassed with an inert gas. For example, a stream of inert gas may be passed through the solution to strip other gases from the solution. Examples of such an inert gas include nitrogen, helium, and argon.

In an embodiment, the molar ratio of the halophthalic anhydride relative to the organic diamine is 1.98:1 to 2.1:1, 1.99:1 to 2.06:1, 2.00:1 to 2.04:1, 2.00:1 to 2.02:1, or 2.00:1 to 2.01:1.

In an embodiment, hexaethylguanidinium chloride is in contact with the bis(halophthalimide) less than 60 minutes before the polymerization starts at 180° C.

The polyetherimides are of formula (1)

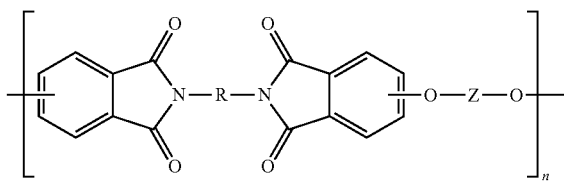

(1)

wherein n is greater than 1, for example 2 to 1000, or 5 to 500, or 10 to 100. Each R in formula (1) is independently the same or different, and is a substituted or unsubstituted divalent organic group, such as a substituted or unsubstituted $C_{6-20}$ aromatic hydrocarbon group, a substituted or unsubstituted straight or branched chain $C_{2-20}$ alkylene group, a substituted or unsubstituted $C_{3-8}$ cycloalkylene group 4. In an embodiment, R is a divalent group of formulas (3)

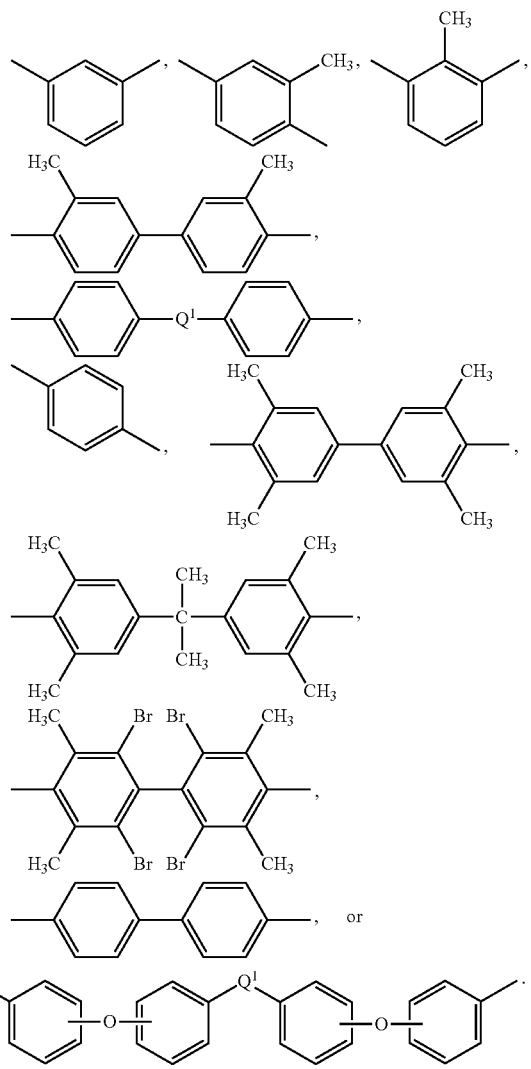

(3)

or a combination thereof wherein $Q^1$ is —O—, —S—, —C(O)—, —SO$_2$—, —SO—, —C$_y$H$_{2y}$— wherein y is an integer from 1 to 5 or a halogenated derivative thereof, including perfluoroalkylene groups, or —(C$_6$H$_{10}$)$_z$— wherein z is an integer from 1 to 4. In some embodiments, R is the diether aromatic moiety having four phenylene groups wherein Q is a direct bond, —O—, —S—, —C(O)—, —SO$_2$—, —SO—, —C$_y$H$_{2y}$— and a halogenated derivative thereof wherein y is an integer from 1 to 5, or —(C$_6$H$_{10}$)$_z$— wherein z is an integer from 1 to 4. In some embodiments, R is m-phenylene, p-phenylene, or a diarylsulfone. The diarylsulfone can be, for example, 4,4'-diphenylsulfone. Embodiments where R is a divalent arylene ether can also be specifically mentioned, for example an arylene ether of the formula

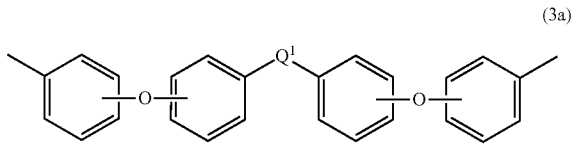

(3a)

wherein $Q^1$ is a direct bond, —O—, —S—, —C(O)—, —SO$_2$—, —SO—, —C$_y$H$_{2y}$— or a halogenated derivative thereof wherein y is an integer from 1 to 5, or —(C$_6$H$_{10}$)$_z$— wherein z is an integer from 1 to 4. In an embodiment, $Q^1$ in formula (3a) is —O—.

The group Z in formula (1) is a substituted or unsubstituted divalent organic group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. Exemplary groups Z include groups of formula (4)

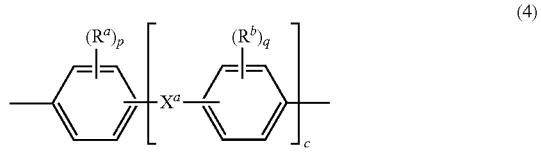

(4)

wherein $R^a$ and $R^b$ are each independently a halogen atom or a monovalent hydrocarbon group; p and q are each independently integers of 0 to 4; c is zero to 4; and $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (4a)

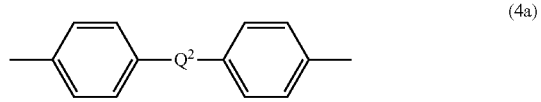

(4a)

wherein $Q^2$ is —O—, —S—, —C(O)—, —SO$_2$—, —SO—, —C$_y$H$_{2y}$— wherein y is an integer from 1 to 5 and halogenated derivatives thereof, including perfluoroalkylene groups. In a specific embodiment, Q is 2,2-isopropylidene.

In another specific embodiment, the polyetherimide comprises more than 1, specifically 10 to 150, or more specifically, 10 to 50 structural units, of formula (1) wherein R is a divalent group of formulas (3) wherein $Q^1$ is —C$_y$H$_{2y}$— wherein y is an integer from 1 to 5 or a halogenated derivative thereof, and Z is a group of formula (4a). In a specific embodiment, R is m-phenylene, p-arylene diphenylsulfone, or a combination thereof, and $Z^1$ is 2,2-(4-phenylene)isopropylidene. An example of a polyetherimide sulfone comprises structural units of formula (1) wherein at least 50 mole percent of the R groups are of formula (2) wherein Q is —SO$_2$— and the remaining R groups are independently p-phenylene or m-phenylene or a combination comprising at least one of the foregoing; and $Z^1$ is 2,2-(4-phenylene)isopropylidene.

The polyetherimides are prepared by the so-called "halo-displacement" or "chloro-displacement" method. In this method, a halophthalic anhydride of formula (7)

(7)

wherein X is a halogen, is condensed (imidized) with an organic diamine of the formula (8)

H$_2$N—R—NH$_2$ (8)

wherein R is as described in formula (1), to form a bis(halophthalimide) of formula (9).

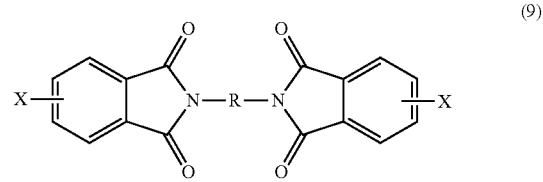

(9)

In an embodiment, X is a halogen, specifically fluoro, chloro, bromo, or iodo, more specifically chloro. A combination of different halogens can be used.

The organic diamine can be 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(4-aminophenyl) propane, 2,4-bis(p-amino-t-butyl) toluene, bis (p-amino-t-butylphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. $C_{1-4}$ alkylated or poly($C_{1-4}$)alkylated derivatives of any of the foregoing can be used, for example a polymethylated 1,6-hexanediamine. Combinations of these compounds can also be used. In some embodiments the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination comprising at least one of the foregoing.

Condensation of halophthalic anhydride (7) and diamine (8) (imidization) can be conducted in the absence or presence of a catalyst. The reaction is generally conducted in the presence of a relatively non-polar solvent, preferably with a boiling point above 100° C., specifically above 150° C., for example o-dichlorobenzene, dichlorotoluene, 1,2,4-trichlorobenzene, a monoalkoxybenzene such as anisole, veratrole, diphenylether, or phenetole. In an embodiment the non-polar solvent is ortho-dichlorobenzene or anisole.

The bis(halophthalimide)s (9) are generally prepared at a temperature of at least 110° C., in an embodiment at less than 180° C. to obtain low color, preferably from 130° C. to 180° C. At temperatures below 110° C., reaction rates may be too slow for economical operation. Preferably reaction is at a temperature of less than 170° C., preferably at a temperature of 130° C. to 160° C. Atmospheric or superatmospheric pressures can be used, for example, up to 5 atmospheres, to facilitate the use of high temperatures without causing solvent to be lost by evaporation.

The solvent, diamine (8), and halophthalic anhydride (7) can be combined in amounts such that the total solids content during the reaction to form bis(halophthalimide) (9) does not exceed 25 wt. %, or 17 wt. %. "Total solids content" expresses the weight of the reactants as a percentage of the total weight including liquids present in the reaction at any given time.

In general practice, a molar ratio of halophthalic anhydride (7) to diamine (8) of 1.98:1 to 2.04:1, or 2:1 is used. According to the invention, a slight excess of anhydride is desired to improve the color of the final product. A proper stoichiometric balance between halophthalic anhydride (7) and diamine (8) is maintained to prevent undesirable by-products or excess starting materials that can limit the molecular weight of the polymer, and/or result in polymers with amine end groups. Accordingly, in an embodiment, imidization proceeds adding diamine (8) to a mixture of halophthalic anhydride (7) and solvent to form a reaction mixture having a targeted initial molar ratio of halophthalic anhydride to diamine; heating the reaction mixture to a temperature of at least 100° C. (optionally in the presence of an imidization catalyst); analyzing the molar ratio of the heated reaction mixture to determine the actual initial molar ratio of halophthalic anhydride (7) to diamine (8); and, if necessary, adding halophthalic anhydride (7) or diamine (8) to the analyzed reaction mixture to adjust the molar ratio of halophthalic anhydride (7) to diamine (8) to 2.01 to 2.3, preferably 2.0 to 2.1.

After imidization, the bis(halophthalimide) (8) is polymerized by reaction with an alkali metal salt of a dihydroxy aromatic compound to provide the polyetherimide (1). In an embodiment, the halogen group X of bis(halophthalimide) (9) is displaced by reaction with an alkali metal salt of a dihydroxy aromatic compound of formula (10)

$$MO\text{-}Z\text{-}OM \tag{10}$$

wherein M is an alkali metal and Z is as described in formula (1), to provide the polyetherimide of formula (1).

Alkali metal M can each independently be any alkali metal, for example, lithium, sodium, potassium, and cesium, or a combination thereof. Specific metals are potassium or sodium. In some embodiments, M is sodium. The alkali metal salt (10) can be obtained by reaction of the metal with an aromatic dihydroxy compound of formula (4), specifically an aromatic $C_{6-24}$ monocyclic or polycyclic dihydroxy compound optionally substituted with 1 to 6 $C_{1-8}$ alkyl groups, 1 to 8 halogen atoms, or a combination thereof, for example, a bisphenol compound of formula (11)

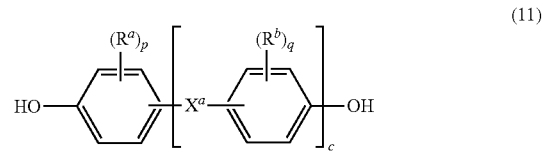

wherein $R^a$, $R^b$, and $X^a$, c are as described in formula (4). In a specific embodiment, the dihydroxy compound corresponding to formulas (4a) can be used. The compound 2,2-bis(4-hydroxyphenyl) propane ("bisphenol A" or "BPA") can be used.

The polymerization can be conducted in the presence of an alkali metal salt of a monohydroxy aromatic compound of formula (12)

$$M^2O\text{-}Z^2 \tag{12}$$

wherein $M^2$ is an alkali metal and $Z^2$ is a monohydroxy aromatic compound. Alkali metal $M^2$ can be any alkali metal, for example, lithium, sodium, potassium, and cerium, and is generally the same as the alkali metal M. Thus alkali metal salt (12) is a lithium salt, sodium salt, potassium salt, cesium salt, or a combination thereof. Specific metals are potassium or sodium. In some embodiments, $M^2$ is sodium. The alkali metal salt (12) can be obtained by reaction of the metal $M^2$ with aromatic $C_{6-24}$ monocyclic or polycyclic monohydroxy compound optionally substituted with 1 to 6 $C_{1-8}$ alkyl groups, 1 to 8 halogen atoms, or a combination thereof, for example, a monohydroxy aromatic compound formula (13)

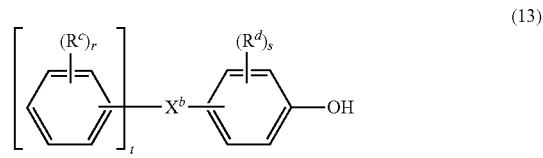

wherein $R^c$ and $R^d$ are each independently a halogen atom or a monovalent hydrocarbon group; r is 0 to 5 and s is of 0 to 4; t is 0 or 1; when t is zero, $X^b$ is hydrogen or a $C_{1-18}$ alkyl group; and when t is 1, $X^b$ is a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic bridging group can be disposed such that the $C_6$ arylene groups connected thereto are each connected to a common alkylidene carbon or to different carbons of the $C_{1-18}$ organic bridging group. In some embodiments, t is zero and $X^b$ is hydrogen or a $C_{4-12}$ alkyl group or t is one and $X^b$ is a single bond or a $C_{1-9}$ alkylene group. In an embodiment, $Z^2$ in structure 12 is a group of formulae (13a)

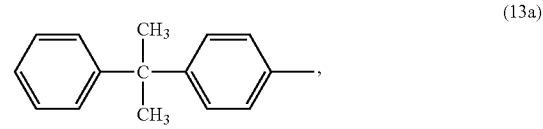

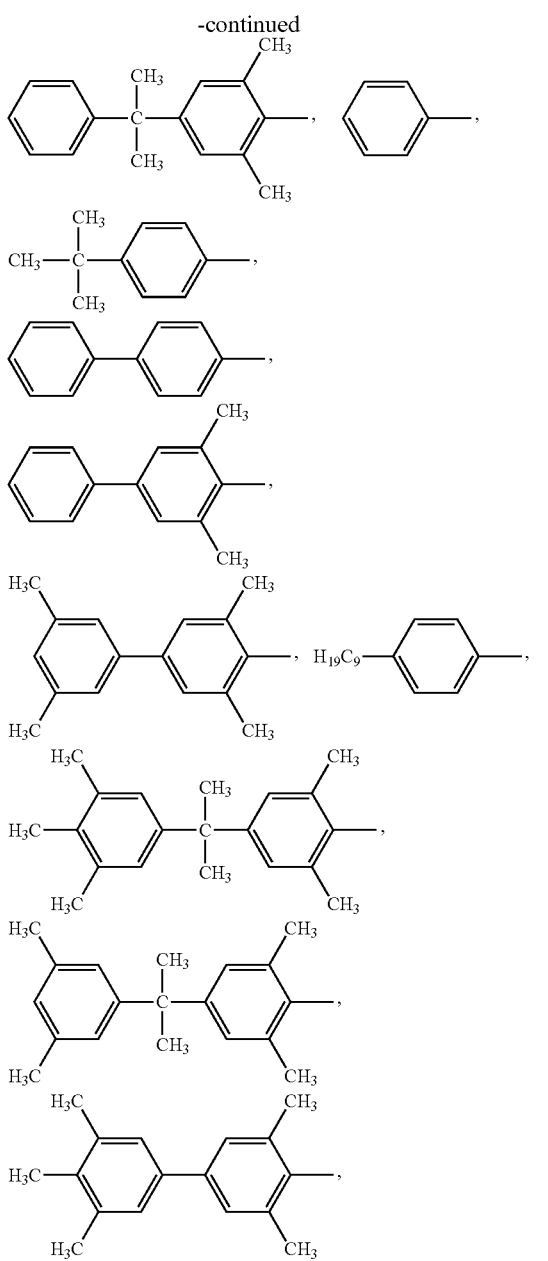

or a combination thereof.

Polymerization by reaction of bis(halophthalimide) (9) with a combination of alkali metal salts (10) and optionally (12) can be in the presence of phase transfer catalyst that is substantially stable under the reaction conditions used, including temperature. Exemplary phase transfer catalysts for polymerization include hexaalkylguanidinium and α,ω-bis(pentaalkylguanidinium)alkane salts. Both types of salts can be referred to herein as "guanidinium salts."

Polymerization is generally conducted in the presence of a relatively non-polar solvent, preferably with a boiling point above 100° C., in an embodiment above 150° C., for example, o-dichlorobenzene, dichlorotoluene, 1,2,4-trichlorobenzene, diphenyl sulfone, a monoalkoxybenzene such as anisole, veratrole, diphenylether, or phenetole. In an embodiment, the non-polar solvent is ortho-dichlorobenzene or anisole.

Polymerization can be conducted at least 110° C., in an embodiment 150° C. to 250° C., and in another embodiment 150° C. to 225° C., in other embodiments 160° C. to 180° C. At temperatures below 110° C., reaction rates may be too slow for economical operation. Atmospheric or super-atmospheric pressures can be used, for example up to 5 atmospheres, to facilitate the use of high temperatures without causing solvent to be lost by evaporation.

In an embodiment, the combination of alkali metal salts (10) and (12) is added to the organic solvent and the water is removed from the mixture, for example, as its azeotrope. The bis(halophthalimide) (9) is prepared from a halo-substituted phthalic anhydride and a diamine in a solvent, and the water of imidization is then removed from the reaction mixture, for example, as its azeotrope, followed by addition of a catalyst in a pre-dried solution in organic solvent. Water removal from the system can be accomplished in either batch, semi-continuous or continuous processes using means known in the art such as a distillation column in conjunction with one or more reactors. In an embodiment, a mixture of water and non-polar organic liquid distilling from a reactor is sent to a distillation column where water is taken off overhead and solvent is recycled back into the reactor at a rate to maintain or increase the desired solids concentration. Other methods for water removal include passing the condensed distillate through a drying bed for chemical or physical adsorption of water.

Polymer is formed from the reaction of the bis(halophthalimide) (9) and the alkali metal salt (10) (formed as described, for example, in U.S. Pat. No. 4,520,204) in a solvent in the presence of a phase transfer catalyst (as described, for example, in U.S. Pat. No. 6,265,521). The molar ratio of the bis(halophthalimide) (9) to the alkali metal salt (10) can be 1.0:0.9 to 0.9:1.0. A solids content of the bis(halophthalimide) (9) in the polymerization can be 15 to 25 wt. %, based on the total weight of the polymerization mixture. In an embodiment, the polyetherimides have a weight average molecular weight (Mw) within the ranges described above, in particular 30,000 to 150,000 Daltons. In some embodiments, the polyetherimides having a YI of less than 93, less than 90, less than 85, or less than 80, for example 50 to 90, 50 to 85, 50 to 80, 50 to 75, 53 to 70, or 55 to 68. This lower color polymer allows use of lower amounts of colorant to meet color specifications. Use of excess colorants can result in loss of other polymer physical properties. A low base polymer color is therefore desirable.

EXAMPLES

The materials in Table 1 were used or made in the following Examples and Comparative Examples.

TABLE 1

| Acronym | Description | Source |
|---|---|---|
| PA | Phthalic anhydride | |
| 3-ClPA | 3-Chlorophthalic anhydride | SABIC |
| 4-ClPA | 4-Chlorophthalic anhydride | SABIC |

TABLE 1-continued

| Acronym | Description | Source |
|---|---|---|
| ClPA | Mixture of 3-chlorophthalic anhydride and 4-chlorophthalic anhydride | SABIC |
| ClPAMI | 1,3-bis[N-(4-chlorophthalimido)]benzene | Examples |
| Mono-ClPAMI (MA) | Mixture of 1-amino-3-N-(4-chlorophthalimido)benzene and 1-amino-3-N-(3-chlorophthalimido)benzene | Examples |
| 4 Monoamine | | Examples |
| 3 Monoamine | | Examples |
| Phthalic anhydride monoamine | Monoimide wherein one of the amino groups of metaphenylene diamine has been imidized with phthalic anhydride | Examples |
| mPD | meta-Phenylene diamine | DuPont |
| BPA | 2,2-Bis(4-hydroxyphenyl)propane (Bisphenol A) | Chiba/CTG |
| BPANa$_2$ | Bisphenol A, disodium salt | SABIC |
| PEI | Polyetherimide | Examples |
| o-DCB | ortho-Dichlorobenzene | Fischer |
| HEGCl | Hexaethylguanidinium chloride | Atul Ltd. |
| SPP | Sodium phenylphosphinate | Akzo |
| NaOH | Sodium hydroxide | Sigma Aldrich |
| KP | Tripotassium phosphate | Sigma Aldrich |

Property Testing

Weight average molecular weight (Mw) of the polymer product was determined by gel permeation chromatography (GPC) using polystyrene standards. Mz is the z-average molecular weight.

APHA is a single number Yellowness Index used for measuring yellow coloration in nearly white liquid samples. APHA index values were determined in accordance with ASTM D1209. Samples of solutions as reported below were analyzed with a Gretag Macbeth Color Eye 7000A instrument. The instrument readings thus obtained are reported as solution APHA values. In some cases the solution APHA value was inserted into a formula to yield a calculated estimate of a dry-weight APHA value.

The APHA of mPD was determined by dissolving 10 grams of mPD in methanol to make a 100 mL solution, and measuring the APHA of the solution. The instrument reading was solution APHA. All APHA values reported for mPD are solution APHA values.

To measure APHA of BPANa$_2$ salt, a 2 gram sample of BPANa$_2$ aqueous solution or o-DCB slurry was taken and diluted up to 100 mL using acetonitrile-water mixture (60: 40, mix by volume). After analyzing the sample for APHA using a Gretag Macbeth Color Eye 7000A instrument, the instrument reading (solution APHA) was converted to APHA on the dry basis of BPANa$_2$ salt as follows:

$$APHA = (\text{Solution APHA} \times 100)/(\text{Sample weight} \times \text{solid wt. \%}) \quad \text{Eq. (1)}$$

All APHA values reported for BPANa$_2$ salt were calculated based on equation (1).

Generally, the YI (Yellowness Index) is a number calculated from spectrophotometric data that describes the color of a test sample as being clear or white (low YI) versus being more yellow (high YI). Sample handling and preparation can affect the test results. The Yellowness Index of polyetherimide polymer was determined by measuring the YI of the resulting solution on a Gretag Macbeth Color Eye 7000A instrument. The instrument reading was referred to as solution YI. The YI values reported are predicted plaque YI calculated based on the following correlation:

$$\text{Predicted Plaque YI} = (\text{Solution YI} + 18.2)/0.5986 \quad \text{Eq. (2)}$$

General Procedures

BPANa$_2$ Salt Synthesis at Lab Scale

A. BPANa$_2$ Salt Synthesis in Water

Before starting BPANa$_2$ salt synthesis, N$_2$ was bubbled overnight through de-mineralized water (about 1 liter contained in a round bottom flask) to remove dissolved oxygen. Once the de-oxygenated water was ready, a 4-neck 1-liter round bottom flask was transferred to a glove box (under N$_2$ environment) along with all the raw materials. Then 41.9 grams of BPA (183.54 mmol), 14.7 grams of NaOH (367.50 mmol) and 449 grams of de-oxygenated water were charged into the flask at room temperature along with a magnetic stirrer, and a condenser was fixed on the top of the flask. The flask was taken to a hood, immersed in an oil bath, and mild magnetic stirring was applied. The whole system was then kept under nitrogen environment for about 30 minutes at room temperature to remove oxygen. Then the oil bath temperature was raised to 70° C. to 80° C. and N$_2$ sweep was provided to maintain inert atmosphere during the course of the reaction. The approximate solid weight % of the BPANa$_2$ salt was around 21%. The system was kept under total reflux conditions to prevent water losses during the reaction. Typically within 1 hour the reaction mass became clear indicating completion of BPANa$_2$ salt formation.

To track the BPANa$_2$ salt quality over time, samples of BPANa$_2$ salt solution were checked at regular time intervals for APHA value and the stoichiometry of the reaction. Based on stoichiometry, corrections were made (either BPA or NaOH) to maintain the desired stoichiometry for BPANa$_2$ salt. The APHA obtained was converted to APHA on the dry basis based on equation (1). This calculated APHA value is also referred to as APHA of BPANa$_2$ (aqueous stage).

B. Solvent Swapping into o-DCB

Before starting the solvent swapping, o-DCB (0.5 to 1 liter) was agitated while applying 150° C. heating oil temperature under N$_2$ sweep for about 0.5 to 1 hour to remove any dissolved oxygen. Aqueous BPANa$_2$ salt solution from step A was added dropwise to o-DCB. The aqueous BPANa$_2$ salt solution feed temperature was maintained at around 70° C. to avoid the precipitation of BPANa$_2$ salt, which may create operational difficulties while performing solvent swapping. The water along with the o-DCB was collected in the Dean-Stark. The total time required for swapping 21 wt. % aqueous BPANa$_2$ salt (100 g batch size) solution was around 5 to 6 hours. After the completion of the swapping, the BPANa$_2$ salt solution temperature was increased slowly to 190° C. for the removal of water/o-DCB mixture, and maintained until the collected water/o-DCB mixture reached the moisture specification of 200 to 400 ppm in the distillate.

C. Homogenization

The o-DCB based $BPANa_2$ salt solution was allowed to cool down to room temperature and then transferred to a 1 liter glass bottle under $N_2$ environment. A lab scale IKA homogenizer (Model: T25 Ultra Turrax) was operated intermittently to homogenize the o-DCB based $BPANa_2$ salt solution at a speed of 8,000 to 9,000 rpm for about 1 hour (instead of using homogenizer continuously, to avoid local heating, it needed to be switched off after every 15 minutes of use for about 5 to 10 minutes). This homogenization operation was carried out under $N_2$ environment at room temperature.

D. Drying

The homogenized $BPANa_2$ salt was then transferred into either a 1 or 2-liter 5-neck round bottom (RB) flask. For those runs in which tripotassium phosphate (KP) had not been added to $BPANa_2$ salt during the solvent swapping stage, KP in the form of an o-DCB based slurry with particle size distribution (PSD) of less than 70 micron was then added in slight excess (1.25 wt. % based on the final polymer weight) at room temperature to the homogenized $BPANa_2$. The 1.25 wt. % excess KP amount was decided based on the observed —OH end group concentration in the final polymer, which should be less than 80 ppm. Particle size of KP was critical to achieve the OH end group specification in the final polymer. $N_2$ was then bubbled through the solution for about 1 to 2 hours at room temperature to remove any oxygen which may have been introduced with the KP slurry or the homogenized $BPANa_2$ salt slurry.

Then the final $BPANa_2$ salt drying was started by adjusting the oil bath temperature to 190° C. to 195° C. The reaction temperature was maintained until the o-DCB collected overhead from the system met the water content specification (less than 20 ppm). Then heating was stopped and the $BPANa_2$ salt solution was cooled down to room temperature. Later it was stored under $N_2$ environment inside a glove box at room temperature. Finally the solid percentage of the $BPANa_2$ salt was measured using HCl titration method. Based on this solid wt. % and measured solution APHA of $BPANa_2$, APHA on dry $BPANa_2$ salt basis was calculated. The calculated APHA is also referred to as APHA of $BPANa_2$ (after drying).

$BPANa_2$ Salt Synthesis at Pilot Scale

A. Aqueous $BPANa_2$ Salt Reaction

BPA addition: The required quantity of water to maintain about 25 wt. % of $BPANa_2$ salt was added into an aqueous salt reactor. It was then heated to about 70° C. to 80° C. under $N_2$ bubbling for 2 hours to deoxygenate the water. A stoichiometric quantity of BPA was added into the pool of hot water at about 80° C. via a hopper in the aqueous reactor.

Caustic lye preparation: The required amount of deoxygenated water to make about 40 wt. % NaOH solution was drained from the aqueous $BPANa_2$ salt reactor prior to BPA addition. The pre-weighed NaOH pellets were added slowly into deoxygenated water to make caustic lye solution. An ice bath or chilling water bath, maintained at 5° C. to 6° C., was used to control excessive heat of dissolution. The caustic lye solution thus prepared was charged into a caustic lye tank which was maintained at room temperature. $N_2$ was bubbled through the caustic lye tank until the addition of caustic lye into the aqueous reactor started.

Aqueous reaction: After completion of the BPA addition into the aqueous $BPANa_2$ salt reactor, it was purged with $N_2$ for at least 1 hour to remove residual oxygen from the reaction mixture. After 1 hour of $N_2$ bubbling, the reactor temperature was decreased to about 70° C. to 74° C. Subsequently, the caustic lye tank was pressurized (about 1 to 1.5 barg) and the caustic lye solution was charged to the $BPANa_2$ reactor over a period of 20 to 30 minutes via a sparger line (perforated dip tube used for caustic addition and $N_2$ bubbling during reaction). As the caustic lye was added, the reactor temperature was allowed to increase by 3° C. to 5° C. due to reaction exotherm. During the initial set of experiments NaOH flakes were charged through a hopper as solid instead of solution. Sufficient care was taken to maintain temperature of the reactor contents below 82° C. by monitoring the rate of NaOH addition. Changing to the addition of lye via sparger helped to minimize the color formation in aqueous $BPANa_2$ salt and also reduced the water loss due to evaporation.

After the completion of NaOH addition, the temperature of the reaction was increased to 80° C. to 85° C. After 1 hour from the completion of caustic lye addition, a sample was removed from the reactor to measure the stoichiometry of the reactant residuals, as described in U.S. Pat. No. 5,851, 837. If the reaction stoichiometry, or "stoic", was not correct, the reaction condition is referred to as not "on stoic", and an adjusting quantity of reactant (BPA or NaOH), was added into the reactor. After 1 hour from the stoic correction, a sample was drawn again and checked for the stoic. The sample was analyzed for APHA to measure the $BPANa_2$ salt color at the aqueous stage. This procedure of sampling, analysis, and stoic correction was repeated until the reaction was on stoic. The on stoic reactor mixture marked the completion of the reaction. The resulting mixture was ready for solvent swapping.

B. Primary Drier (Solvent Swapping) and Homogenization

Once the aqueous $BPANa_2$ salt reaction was considered complete, the aqueous $BPANa_2$ salt reactor was pressurized to about 4 barg and the $BPANa_2$ salt solution was sprayed via spray nozzles into a primary drier ($1^{st}$ drier) containing a pool of hot o-DCB at 130° C. to 145° C. The 1st drier was always maintained under $N_2$ purge (about 8 to 10 Kg/hr of $N_2$). As the $BPANa_2$ salt solution was sprayed, free moisture (unbound water) was quickly evaporated and the $BPANa_2$ precipitated as a white solid in o-DCB. During the course of solvent swapping, the quantity of o-DCB lost with water due to azeotropic boiling was replaced with fresh o-DCB from the dry o-DCB storage vessel (earlier o-DCB was stored either at 175° C. or 145° C.) so as to maintain a constant percentage solid (13%) of the resulting $BPANa_2$ salt slurry.

After the completion of $BPANa_2$ salt spray over, the temperature of the $1^{st}$ drier was increased to remove the free moisture by stripping of o-DCB at its boiling temperature (180° C.). Once the moisture measured in the vapor condensate was decreased to less than 50 ppm, the $1^{st}$ drier temperature was decreased to 140° C. to 150° C. The $BPANa_2$ salt slurry in o-DCB was re-circulated using a pump via a homogenizer (grinder) to reduce the particle size of $BPANa_2$ salt. After 1 hour of homogenization, a pre-homogenized KP slurry in o-DCB was pumped into the drier. During the course of homogenization, $BPANa_2$ salt samples were withdrawn and checked for the particle size distribution. The homogenization was continued until the $BPANa_2$ salt particles met the process specification (particle size target less than 100 microns), normally at the end of 2.5 hours. The same sample was analyzed for APHA to track the color of the $BPANa_2$ salt.

C. Secondary Drier

The relatively dry slurry (less than 200 ppm moisture) from the $1^{st}$ stage drier, at about 15% solids, was transferred to a $2^{nd}$ stage dryer to remove the residual moisture before its use in polymerization. After the transferring of the BPANa$_2$ salt was complete, the temperature of the 2$^{nd}$ stage dryer was increased to 180° C. to remove any bound or unbound moisture from the BPANa$_2$ salt slurry. Again, at this stage the o-DCB lost due to azeotropic boiling with water was compensated by charging hot dry o-DCB from the header into the 2$^{nd}$ drier. During the course of drying, samples were drawn and analyzed for moisture by KF titration. Once the BPANa$_2$ salt slurry was dried to less than 20 ppm moisture, the BPANa$_2$ salt slurry was concentrated to a desired level, for example, about 15% by weight by driving off o-DCB. After the BPANa$_2$ salt concentration was completed, the temperature of BPANa$_2$ salt slurry was decreased to about 150° C. and stored under nitrogen atmosphere until used in the polymerization step. The concentrated BPANa$_2$ salt slurry sample was withdrawn to measure the BPANa$_2$ salt solid wt. % in o-DCB and APHA color. In a further simplification of the process, both drying stages can be conducted in a single drier.

Imidization

Typical ratios of raw materials charged during the course of imidization and then polymerization are provided below in Table 2.

TABLE 2

| Raw material | Value | UOM |
| --- | --- | --- |
| mPD/ClPA | 29.6 | % · wt |
| PA/ClPA | 0.9 | % · wt |
| HEGCl/Polymer | 0.8 to 1 | % · mol |
| BPA Salt/mPD | 2.5 | kg/kg |

Wet o-DCB was charged into a reactor equipped with a mechanical stirrer, a solids addition port, an overhead line with condenser, various addition nozzles, and means to maintain a nitrogen atmosphere. The quantity of o-DCB used in a particular reaction was based on the desired percentage solids of the imidization reaction.

Lab Scale Protocol

High Temperature Process

After charging o-DCB, all the raw materials (mPD, PA and ClPA (95:5 mixture of 4-ClPA and 3-ClPA) were charged into the reactor at room temperature (25° C.). The mixture was kept under continuous nitrogen sweep for an hour to de-oxygenate the system. The temperature of the reaction was then slowly raised to 176° C. in steps within an hour.

Low Temperature Process

After charging o-DCB, all the raw materials (mPD, PA, and ClPA as a 95:5 mixture of 4-ClPA and 3-ClPA) were charged into the reactor at room temperature (25° C.). The mixture was kept under continuous nitrogen sweep for an hour to de-oxygenate the system. The temperature of the reaction was then raised to 140° C. (hot oil temperature at 150° C.) and vacuum was applied to the system at 360 mbar. The operation continued under these conditions until the moisture content was less than 200 ppm in the condensate, and then the amine-anhydride stoichiometry was adjusted to the target value in the range 0.1 to 0.5 anhydride rich. Then, HEGCl catalyst was added and kept 1 hour at 140° C. and 360 mbar. Vacuum was then released and the reactor hot oil temperature was raised to 180° C. After 45 minutes, BPA disodium salt was added and polymerization was completed.

Pilot Scale Protocol: High Temperature Method

After charging o-DCB, the temperature of the reactor was increased to about 120° C. During this time o-DCB was degassed by bubbling nitrogen through it. When the temperature reached 120° C., ClPA and PA were charged manually through the reactor's hopper. Subsequently the hopper was flushed by o-DCB. Next, the temperature of the reactor was increased to about 160° C. over a period of 45 minutes. The reactor was held at this temperature for about 30 minutes to ensure a homogeneous mixture in the reactor. During this time nitrogen was bubbled through the reactant mixture to remove any dissolved gases.

Another vessel was charged with mPD and o-DCB at room temperature. The mixture was bubbled with nitrogen for 2 hours, and then heated to 75° C. to 80° C. to provide a solution of mPD dissolved in o-DCB (solid wt. %=25 to 27%). The mPD solution thus prepared was charged slowly into the imidization reactor at about 160° C. over a period of 45 minutes. After the completion of the mPD addition, the temperature of the reactor was increased to about 170° C. to 175° C. and was held at this temperature for the duration of the reaction. During this period mPD reacted with ClPA to provide o-DCB based ClPAMI slurry containing intermediate products of this reaction and water as byproduct. Water vapors leaving the reactor along with o-DCB were condensed and collected in the collection pot. At the end of 2 hours, an aliquot sample was drawn from the reaction vessel to measure the stoichiometry of the reaction. The following species were analyzed for stoichiometry calculations: 4-chlorophthalic acid, 3-chlorophthalic acid, phthalic acid, 4-chlorophthalic anhydride, 3-chlorophthalic anhydride, phthalic anhydride, 4-monoamine, 3-monoamine, and phthalic anhydride monoamine The stoichiometry of ClPAMI was calculated using the analysis data for the above chemical species and the appropriate reactant (either ClPA or mPD—referred as stoic correction) was charged to achieve the desired stoichiometry in the imidization reactor. After 1 hour from the completion of stoic correction, a sample was drawn again for measuring the stoic. The activity of sampling and stoic correction was repeated until the desired reaction specification was achieved. Once the reaction was on spec, the ClPAMI was dried to less than 20 ppm moisture by stripping of o-DCB. The on stoic, dried ClPAMI thus prepared marked the completion of imidization reaction. Generally, the ClPAMI/o-DCB slurry was about 13 to 17% solids. Once the moisture specification was achieved, ClPAMI was considered ready for polymerization.

Polymerization

Process 1

Once the ClPAMI was on stoic then it was dried to achieve less than 20 ppm moisture as measured in the distilled solvent from the reaction vessel. Then 1 mole % HEGCl (containing about 500 to 1,000 ppm moisture) was added to ClPAMI and the mixture was dried to less than 20 ppm moisture, again as measured in the distilled solvent from the reaction vessel. Once the dried ClPAMI met all the specs (Stoic: −0.1 to 0.3 mole % ClPA rich, residual 3-MA and 4-MA less than about 0.04 mole %), dry BPANa$_2$ salt was added (maintained at 165° C. to 170° C.) over a period of about 30 to 60 minutes to start the polymerization.

Process 2

Once the ClPAMI was on stoic, then it was dried to achieve less than 20 ppm moisture as measured in the distilled solvent from the reaction vessel. After the dried ClPAMI met all the specs (Stoic: −0.15-0.3 mole % ClPA rich, residual MA, (4-MA plus 3-MA); total residual MA in the ClPAMI is abbreviated r-MA 0.1-1.0 mole %), dry BPANa$_2$ salt (maintained at 165° C. to 170° C. for pilot scale) was added over a period of about 20 min. Once the BPANa$_2$ salt addition was complete, the o-DCB based HEGCl solution (moisture less than 50 ppm) was added to start the polymerization. For lab scale, BPANa$_2$ salt dried below 20 ppm moisture and stored at room temperature under N$_2$ environment was used to start the polymerization.

For both process 1 and process 2, polymerization ran at about 180° (boiling point of o-DCB). Samples were withdrawn during the course of polymerization to track the molecular weight built by Gel Permeation chromatography (GPC). NaCl was the byproduct of the polymerization reaction and it was removed in downstream operations. Polymerization reactions were typically run at 20 to 25% solids concentration in lab whereas about 25 to 27% solids at pilot scale.

Polymer Isolation and Purification

After the completion of the polymerization reaction the polymer mass was diluted to approximately 10 wt. % with dry o-DCB. A desired amount of $H_3PO_4$ (85 wt. % in water) was then added to quench the polymerization reaction at 165° C. to 170° C. This lowered the color of the reaction mass. Once the reaction mass pH was less than 3, the quenching was complete. The total quenching time was about an hour. After quenching, the reaction mass was cooled down to 90 to 150 and passed through vacuum filter assembly to remove the NaCl out of the system. The clear filtrate was then analyzed for solid % and Yellowness Index (YI).

Examples 1-4

These examples show that producing ClPAMI monomer at low temperatures improves the color of polyetherimide polymer.

Example 1

A lab reactor was charged with 40 g mPD, 135.72 g ClPA (4-isomer:3-isomer ratio, 95:5), 0.99 g PA, and 1483 g o-DCB. Nitrogen was bubbled through the reactor overnight. The reactor was heated with an oil bath, which temperature was set at 150° C., under nitrogen. The reaction mixture reached maximum viscosity at 105° C. ClPAMI crashed out from the reaction mixture at 120° C. Vacuum was applied to the reactor (−0.6 barg). The hot oil temperature of the oil bath was set at 170° C. and the o-DCB boiling point was stabilized at 138.5° C. to 139.5° C. If needed, hot oil temperature was decreased and $N_2$ flow rate was increased to cool down the reaction mixture. A sample was drawn to measure the stoic and a stoic correction was made (either a small amount of ClPA or mPD was added to achieve the desired stoichiometry for the ClPAMI). The ClPAMI stoic was monitored during drying and corrections made if needed. When the moisture content was less than 200 ppm in the condensate distilled from the reaction vessel, HEGCl was added and vacuum and temperature conditions were maintained in the reactor for 45 minutes. Then, the hot oil bath temperature was increased to 190° C. and kept at this temperature for 45 minutes at atmospheric pressure. Solvent was distilled from the reaction vessel and condensed. When the moisture in the condensate with <20 ppm and the desired % solids of ClPAMI in ODCB was achieved (14 to 18 wt. %), then $BPANa_2$ was added and the polymerization was started. The obtained polyetherimide had a YI of 57 after diluting the reaction mixture to 10 wt. % solids with o-DCB, quenching with phosphoric acid and filtration to remove the sodium chloride.

Example 2

135.73 g of ClPA (4-isomer:3-isomer ratio, 95:5), 40 g mPD (Aldrich, 30-105 APHA) and 1400 g o-DCB (Aldrich, lab grade) were charged to a hot oil jacketed reactor. The hot oil temperature was set at 130° C. and the reaction mixture was mechanically agitated under nitrogen. When the ClPAMI crashed in solution (105° C. to 110° C.), the hot oil temperature was set at 150° C. and vacuum was applied to the system at 360 mbar (−0.6 barg, 300 mm) to stabilize the reactor internal temperature at 139° C. to 141° C. The bulk water was distilled from the reaction vessel under vacuum conditions to less than 200 ppm in condensate and a sample was taken to adjust the stoic amine-anhydride to the target value in the range of 0.1 to 0.5 anhydride rich. Then, HEGCl catalyst was added and kept 1 hour at 140° C. and 360 mbar. Vacuum was then released and the reactor hot oil temperature was set at 190° C. After 45 minutes with the internal reactor temperature stable at 173° C. to 178° C., BPA disodium salt was added and 219 g of polyetherimide polymer were made. The obtained polyetherimide had a YI of 61 after diluting the reaction mixture to 10 wt. % solids with o-DCB, quenching with phosphoric acid and filtration to remove the sodium chloride.

Example 3

135.73 g of ClPA (4-isomer:3-isomer ratio, 95:5), 40 g mPD (Aldrich, 30-105 APHA) and 1400 g o-DCB (Aldrich, lab grade) are charged a hot oil jacketed reactor. Hot oil temperature was set at 130° C. and the reaction mixture was mechanically agitated. When the ClPAMI crashed in solution (105° C. to 110° C.), the hot oil was set at 150° C. and vacuum was applied to the system at 360 mbar (−0.6 barg) to stabilize the reactor internal temperature at 139° C. to 141° C. The bulk water was eliminated under vacuum conditions to less than 200 ppm in the condensate and a sample was taken to adjust the stoic amine-anhydride to the target value in the range of 0.1 to 0.5 anhydride rich. Then, HEGCl catalyst was added and kept 1 hour at 140° C. and 360 mbar. Vacuum was then released and the reactor hot oil temperature was set at 190° C. After 45 minutes with the internal reactor temperature stable at 173° C. to 178° C., BPA disodium salt was added and 219 g of polyetherimide polymer were made. The obtained polyetherimide had a YI of 62 after diluting the reaction mixture to 10 wt. % solids with o-DCB, quenching with phosphoric acid and filtration to remove the sodium chloride.

In Table 3 are registered data on the monomers as well as the Mw of the final polymer solution and the YI.

TABLE 3

| | | ClPAMI | | | BPA Salt | | Polymer | |
|---|---|---|---|---|---|---|---|---|
| | mPD APHA color | rMA (mol %) | | Stoic (mol %) | APHA color | % solids | Mw | YI |
| Exp 1 | 30-70 | 0 | | 0.37 | 77-81 | 23.19 | 71971 | 57 |
| Exp 2 | 30-70 | 0 | | 0.08 | 77-81 | 23.45 | 47311 | 61 |
| Exp 3 | 30-70 | 0 | | 0.08 | 77-81 | 23.28 | 42737 | 62 |

Example 4

135.73 g of ClPA (4-isomer:3-isomer ratio, 95:5), 40 g mPD (Aldrich, 30-105 APHA) and 1400 g o-DCB (Aldrich, lab grade) were charged to a hot oil jacketed reactor equipped with mechanical agitation and means to maintain a nitrogen atmosphere. The hot oil temperature was set at 130° C. and agitation was connected. When the ClPAMI crashed in solution (105° C. to 110° C.), hot oil was set at 150° C. and vacuum was applied to the system at 360 mbar (−0.6 barg) to stabilize the reactor internal temperature at 139° C. to 141° C. The bulk water was eliminated under vacuum conditions to less than 200 ppm in condensate and a sample was taken to adjust the stoic amine-anhydride to the target value in the range of 0.1 to 0.5 anhydride rich. Then, HEGCl was added and kept 1 hour at 140° C. and 360 mbar. Vacuum was then released and the reactor hot oil temperature was set at 190° C. After 45 minutes with the internal reactor temperature stable at 173° C. to 178° C., BPA disodium salt was added and 219 g of polyetherimide polymer were made. The obtained polyetherimide had a YI of 66 after diluting the reaction mixture to 10 wt. % solids with o-DCB, quenching with phosphoric acid and filtration to remove the sodium chloride.

Example 5

135.73 g of ClPA (4-isomer:3-isomer ratio, 95:5), 40 g mPD (Aldrich, 30-105 APHA) and 1400 g o-DCB (Aldrich, lab grade) were charged to a hot oil jacketed reactor. The hot oil temperature was set at 130° C. and agitation was connected. When the ClPAMI crashed in solution (105° C. to 110° C.), hot oil was set at 150° C. and vacuum was applied to the system at 360 mbar (−0.6 barg) to stabilize the reactor internal temperature at 139° C. to 141° C. The bulk water was eliminated under vacuum conditions to less than 200 ppm in condensate and a sample was taken to adjust the stoic amine-anhydride to the target value in the range of 0.1 to 0.5 anhydride rich. Then, HEGCl was added and kept 1 hour at 140° C. and 360 mbar. Vacuum was then released and the reactor hot oil temperature was set at 190° C. After 45 minutes with the internal reactor temperature stable at 173° C. to 178° C., BPA disodium salt was added and 219 g of polyetherimide polymer were made. The obtained polyetherimide had a YI of 65 after diluting the reaction mixture to 10 wt. % solids with o-DCB, quenching with phosphoric acid and filtration to remove the sodium chloride.

In Table 4 are registered data on the monomers as well as the Mw of the final polymer solution and the YI.

TABLE 4

| | ClPAMI | | | BPA Salt | | Polymer | |
|---|---|---|---|---|---|---|---|
| | mPD APHA | rMA (mol %) | Stoic (mol %) | APHA color | % solids | Mw | YI |
| Exp 4 | 103 | 0.023 | 0 | 77-81 | 23.26 | 67966 | 66 |
| Exp 5 | 103 | 0.014 | 0.37 | 77.81 | 23.26 | 44040 | 65 |

Example 6

135.73 g of ClPA (4-isomer:3-isomer ratio, 95:5), 40 g mPD (Aldrich, 30-105 APHA) and 1400 g o-DCB (Aldrich, lab grade) were charged to the hot oil jacketed reactor. Hot oil temperature was set at 130° C. and agitation was connected. When the ClPAMI crashed in solution (105° C. to 110° C.), hot oil was set at 150° C. and to stabilize the reactor internal temperature in the 138° C. to 145° C. range. The bulk water was eliminated to less than 200 ppm in condensate and a sample was taken to adjust the stoic amine-anhydride to desired value in the range 0.1 to 0.5 anhydride rich. Then, HEGCl catalyst was added and kept 1 hour at 138° C. to 145° C. After that time, the reactor hot oil temperature was set at 190° C. and after 45 minutes with the internal reactor temperature stable at 173° C. to 178° C., BPA disodium salt was added and 219 g of polyetherimide polymer were made. Vacuum was not used at any point during this experiment, and constant $N_2$ flow (sweep and sparge) was maintained during the time at which the material was heated at 138° C. to 145° C. The final YI of the polymer was 64 units after diluting the reaction mixture to 10 wt. % solids with o-DCB, quenching with phosphoric acid and filtration to remove the sodium chloride.

Example 7

135.73 g of ClPA (4-isomer:3-isomer ratio, 95:5), 40 g mPD (Aldrich, 30-105 APHA) and 1400 g o-DCB (Aldrich, lab grade) were charged to the hot oil jacketed reactor. The hot oil temperature was set at 130° C. and agitation was connected. When the ClPAMI crashed in solution (105° C. to 110° C.), hot oil was set at 150° C. and to stabilize the reactor internal temperature in the 138° C. to 145° C. range. The bulk water was eliminated to less than 200 ppm in condensate and a sample was taken to adjust the stoic amine-anhydride to desired value in the range 0.1 to 0.5 anhydride rich. Then, HEGCl catalyst was added and kept 1 hour at 138° C. to 145° C. After that time, the reactor hot oil temperature was set at 190° C. and after 45 minutes with the internal reactor temperature stable at 173° C. to 178° C., BPA disodium salt was added and 219 g of polyetherimide polymer were made. Vacuum was not used at any point during this experiment, and constant N2 flow (sweep and sparge) was maintained during the time when the reaction mixture was heated to 138° C. to 145° C., before the BPANa2 was added. The final YI of the polymer was 66 units after diluting the reaction mixture to 10 wt. % solids with o-DCB, quenching with phosphoric acid and filtration to remove the sodium chloride.

Example 8

135.73 g of ClPA (4-isomer:3-isomer ratio, 95:5), 40 g mPD (Aldrich, 30-105 APHA) and 1400 g o-DCB (Aldrich, lab grade) were charged to the hot oil jacketed reactor. The hot oil temperature was set at 130° C. and agitation was connected. When the ClPAMI crashed in solution (105° C. to 110° C.), hot oil was set at 150° C. and to stabilize the reactor internal temperature in the 138° C. to 145° C. range. The bulk water was eliminated to less than 200 ppm in condensate and a sample was taken to adjust the stoic amine-anhydride to desired value in the range 0.1 to 0.5 anhydride rich. Then, HEGCl catalyst was added and kept 1 hour at 138° C. to 145° C. After that time, the reactor hot oil temperature was set at 190° C. and after 45 minutes with the internal reactor temperature stable at 173° C. to 178° C., BPA disodium salt was added and 219 g of polyetherimide polymer were made. Vacuum was not used at any point during this experiment, and constant N2 flow (sweep and sparge) was maintained during the time the ClPAMI reaction mixture was maintained at 138° C. to 145° C. The final YI of the polymer was 64 units after diluting the reaction mixture to 10 wt. % solids with o-DCB, quenching with phosphoric acid and filtration to remove the sodium chloride.

In Table 5 are data on the monomers as well as the Mw of the final polymer solution and the YI for examples 6-8.

TABLE 5

| | ClPAMI | | | BPA Salt | | Polymer | |
|---|---|---|---|---|---|---|---|
| | mPD APHA | rMA (mol %) | Stoic (mol %) | APHA color | % solids | Mw | YI |
| Exp 6 | 103 | 0.24 | 0.11 | 57 | 22.88 | 38325 | 64 |
| Exp 7 | 103 | 0.4 | 0.24 | 57 | 22.88 | 42916 | 66 |
| Exp 8 | 103 | 0.36 | 0.11 | 57 | 23.28 | 45559 | 64 |

Comparative Example 9

Polyetherimide polymer was prepared using ClPAMI monomer manufactured following the standard procedure at 180° C. 108.4 g of ClPA (4-isomer:3-isomer ratio, 95:5), 26.8 g mPD (Dupont, 30-105 APHA) and 1400 g o-DCB (Aldrich, lab grade) were charged to the reactor. Hot oil temperature was set at 180° C. and the reactor internal temperature stabilized in the 160° C. to 165° C. range until bulk water was eliminated (less than 200 ppm in condensate). Then, the hot oil temperature was increased to 190° C. (internal temperature was about 175° C.) and the stoic amine-anhydride was adjusted to target value in the range 0.1 to 0.5 anhydride rich. The HEGCl catalyst was added and kept 1 hour with the reaction mass at 173° C. to 178° C. Then, BPA disodium salt was added and 146.4 g of polyetherimide polymer were made. The final YI of the polymer was 90 units.

Comparative Example 10

Polyetherimide polymer was prepared using ClPAMI monomer manufactured following the standard procedure at 180° C. 108.4 g of ClPA (4-isomer:3-isomer ratio, 95:5), 26.8 g mPD (Dupont, 30-105 APHA) and 1400 g o-DCB (Aldrich, lab grade) were charged to the reactor. Hot oil temperature was set at 180° C. and the reactor internal temperature stabilized in the 160° C. to 165° C. range until bulk water is eliminated (less than 200 ppm in condensate). Then, the hot oil temperature was increased to 190° C. (internal temperature is about 175° C.) and the stoic amine-anhydride was adjusted to target value in the range 0.1 to 0.5 anhydride rich. The HEGCl catalyst was added and kept 1 hour with the reaction mass at 173° C. to 178° C. Then, BPA disodium salt was added and 146.4 g of polyetherimide polymer were made. The final YI of the polymer was 94 units.

In Table 6 are registered data on the monomers as well as the Mw of the final polymer solution and the YI.

Main conclusion derived from reactions 1 through 5 is that making ClPAMI monomer at an internal reactor temperature around 140° C. and under vacuum conditions leads to polyetherimide polymer solution of average YI=62 units. Vacuum is used to make the ClPAMI.

Main conclusion derived from reactions 6 through 8 is that making ClPAMI monomer at low temperature (about 140° C.) leads to polyetherimide polymer solution having a YI of less than 80, for example 50 to 70 or 55 to 60, with average YI=65. No vacuum is used to make the ClPAMI.

Main conclusion derived from reactions 13 and 14 is that making ClPAMI monomer at high temperature (about 175° C.) leads to produce polyetherimide polymer solution of significantly higher YI, for example greater than 85 (90, 94). No vacuum is used to make the ClPAMI.

Overall conclusion is that polymer made from ClPAMI produced at low temperature (about 140° C.) has a YI of 20 to 30 units lower in comparison with similar polymer derived from ClPAMI produced at high temperature (about 175° C.).

Table 7 shows general conditions for the related Examples (1-10).

TABLE 7

| | Vacuum | ClPAMI T (° C.) | Polymer YI |
|---|---|---|---|
| Exp 1 | yes | 139-141 | 57 |
| Exp 2 | yes | 139-141 | 61 |
| Exp 3 | yes | 139-141 | 62 |
| Exp 4 | yes | 139-141 | 66 |
| Exp 5 | yes | 139-141 | 65 |
| Exp 6 | no | 139-141 | 64 |
| Exp 7 | no | 139-141 | 66 |
| Exp 8 | no | 139-141 | 64 |
| Exp 9 | no | 175 | 90 |
| Exp 10 | no | 175 | 94 |

Examples 11-21

These examples show the effect of the presence of chlorophthalides in the ClPAMI on polymer YI. A ClPAMI master batch was made at high temperature. Several ClPAMI samples were taken and spiked with different amounts of Cl-phthalides. These ClPAMI's were reacted with the same BPA salt lot to make polymer following polymerization process 1.

TABLE 6

| | Baseline, High Temperature Imidization | | | | | | |
|---|---|---|---|---|---|---|---|
| | ClPAMI | | | BPA Salt | | Polymer | |
| | mPD APHA | rMA (mol %) | Stoic (mol %) | APHA color | % solids | Mw | YI |
| Exp 9 | 59 | 0.05 | 0.26 | 81 | 22.81 | 45293 | 90 |
| Exp10 | 59 | 0.09 | 0.1 | 81 | 22.81 | 42496 | 94 |

A ClPAMI master batch was made at low temperature. Several ClPAMI samples are taken and spiked with different amounts of Cl-phthalides. These ClPAMI's are reacted with the same BPA salt lot to make polymer following polymerization process 1.

The polymer made was analyzed for YI. The results are presented in Table 8.

TABLE 8

| Example | Imidization T ° C. | Cl-phthalides Spike | Polymer YI |
|---|---|---|---|
| 11 | about 175 | 12 ppm | 67 |
| 12 | about 175 | 12 ppm | 69 |
| 13 | about 175 | 132 ppm | 72 |
| 14 | about 175 | 262 ppm | 128 |
| 15 | about 175 | 392 ppm | 129 |
| 16 | about 140 | 12 ppm | 66 |
| 17 | about 140 | 12 ppm | 66 |
| 18 | about 140 | 132 ppm | 65 |
| 19 | about 140 | 262 ppm | 80 |

The data indicates that spiking the ClPAMI with Cl-phthalides causes an increase in the polymer YI. The effect can be observed in the ClPAMI made at low temperature and in the ClPAMI made at high temperature, but the increase is dramatically greater when the spike was done in the ClPAMI made at high temperature.

Examples 20-22

The ClPA used to make the ClPAMI's used in Examples 22-30 was extra purified by crystallization and/or distillation, then used to make a ClPAMI masterbatch at low temperature. The batch was split in 3 parts and each one was spiked with different amounts of chlorophthalides, low (12 ppm), medium (63 ppm) and high (393 ppm). These spiked ClPAMI's were reacted with the same source of BPA salt to make polymer following polymerization process 1. The YI results can be seen in Table 9.

TABLE 9

| Example | Imidization T | Cl-phthalides Spike | Polymer YI |
|---|---|---|---|
| 20 | about 140 | 12 ppm | 56 |
| 21 | about 140 | 63 ppm | 64 |
| 22 | about 140 | 393 ppm | 90 |

The YI values were lower when extra purified ClPA was used to make the ClPAMI, but it can be clearly observed that the presence of chlorophthalides caused an increase in the YI, even when extra purified ClPA was used.

Examples 23-26

These examples show the effect of imidization stoic on polyetherimide polymer color. A master batch of ClPAMI was spiked with either mPD or ClPA to adjust the ClPAMI stoic. The imidization sample was analyzed by HPLC and the stoic was calculated based on the residual amine and anhydride concentrations. The ClPAMI samples having different stoic were reacted with the same batch of BPANa$_2$ salt following the procedure of polymerization process 2. The obtained polyetherimide polymers were analyzed and the results are shown in Table 10.

TABLE 10

| Example No. | Imide Stoic* | Mol wt of PEI | YI of PEI |
|---|---|---|---|
| 23 | 0.10% | 51379 | 78 |
| 24 | 0.10% | 55300 | 79 |
| 25 | −0.24% | 61761 | 102 |
| 26 | −0.26% | 49820 | 103 |

Imide stoic = {Moles of residual ClPA − Moles of residual MA − (2 * Moles of residual mPD)} * 100/{2 * moles of mPD charged}

The data indicate that amine rich imide provides higher YI polymer than anhydride rich imide. Therefore, the imide stoic is a significant factor in determining the final polymer YI. Anhydride rich stoic of about 0 to 0.2 mol % produced low color PEI.

The claims are further illustrated by the following non-limiting embodiments.

Embodiment 1

A method for the manufacture of a polyetherimide, the method comprising (a) reacting a halophthalic anhydride of formula (7) with an organic diamine having the formula H$_2$N—R—NH$_2$ at a temperature of less than 180° C. to form a bis(halophthalimide) of formula (9); and (b) contacting the bis(halophthalimide) with an alkali metal salt of a dihydroxy aromatic compound having the formula MO-Z-OM to form the polyetherimide comprising the structural units of formula (1), as defined above, wherein the polyetherimide has a Yellowness Index of less than 93.

Embodiment 2

The method of Embodiment 1 comprising reacting the halophthalic anhydride with the organic diamine at a temperature of less than 170° C.

Embodiment 3

The method of Embodiment 1 or 2, comprising reacting the halophthalic anhydride with the organic diamine at a temperature of 130° C. to 160° C.

Embodiment 4

The method of any preceding Embodiment, further comprising combining a halophthalic anhydride of formula (7) with an organic diamine having the formula H$_2$N—R—NH$_2$ at a temperature of 18° C. to 25° C. to provide a reaction mixture; degassing the solution with an inert gas; and heating the solution to a temperature of less than 180° C.

Embodiment 5

The method of Embodiment 4, wherein the solution is heated to a temperature of less than 170° C.

Embodiment 6

The method of Embodiment 4, wherein the solution is heated to a temperature of 130° C. to 160° C.

Embodiment 7

The method of any preceding Embodiment, wherein less than 0.75% of hexaethyl guanidinium chloride (HEGCl) is added to the bis(halopthalimide) once it is formed.

Embodiment 8

A method for the manufacture of a polyetherimide, the method comprising (a) contacting a halophthalic anhydride of formula (7) which contains less than 0.02% of residual halophthalide, preferably chlorophthalide; with an organic diamine of the formula $H_2N$—R—$NH_2$ to provide an imidization composition containing the halophthalic anhydride and the organic diamine, the imidization composition comprising less than 0.75% of HEGCl and less than 0.02% of residual halophthalide, preferably chlorophthalide; (b) reacting the imidization composition to form a bis(halophthalimide) of formula (9) and (c) contacting the bis(halophthalimide) with an alkali metal salt of a dihydroxy aromatic compound having the formula MO-Z-OM to form the polyetherimide comprising the structural units of formula (1) as described above, wherein the polyetherimide has a Yellowness Index of less than 93.

Embodiment 9

The method of any preceding Embodiment, wherein the imidization composition comprises less than 0.75% of HEGCl.

Embodiment 10

The method of any preceding Embodiment, wherein the imidization composition comprises less than 0.02% of halophthalide, preferably chlorophthalide.

Embodiment 11

The method of Embodiment, wherein the molar ratio of the halophthalic anhydride to the organic diamine is 2:1 to 2.04:1.

Embodiment 12

The method of any preceding Embodiment, wherein hexaethylguanidinium chloride is in contact with the bis(halophthalimide) less than 60 minutes at 180° C., before the polymerization starts.

Embodiment 13

The method of any preceding Embodiment, wherein the HEGCl is in contact with the bis(halophthalimide) less than 180 minutes when reacting the halophthalic anhydride with the diorganic amine at temperature of less than 170° C.

Embodiment 14

The method of any preceding Embodiment, wherein HEGCl is in contact with the bis(halophthalimide) less than 20 hours when reacting the halophthalic anhydride with the diorganic amine at temperature of 130° C. to 160° C.

Embodiment 15

A method for the manufacture of a polyetherimide, the method comprising (a) contacting a halophthalic anhydride of formula (7) with an organic diamine of formula $H_2N$—R—$NH_2$ to form a bis(halophthalimide) of formula (9) wherein the molar ratio of the halophthalic anhydride relative to the organic diamine is 2:1 to 2.02:1; and (b) contacting the bis(halophthalimide) with an alkali metal salt of a dihydroxy aromatic compound of formula MO-Z-OM to form the polyetherimide comprising the structural units of formula (1) as described above, wherein the polyetherimide has a Yellowness Index of less than 93.

Embodiment 16

A method for the manufacture of a polyetherimide, the method comprising (a) contacting a halophthalic anhydride of formula (1) and containing less than 0.02% of residual halophthalide, preferably chlorophthalides with an organic diamine having the formula $H_2N$—R—$NH_2$ to form a bis(halophthalimide) of formula (9); and (b) polymerizing the bis(halophthalimide) and an alkali metal salt of a dihydroxy aromatic compound having the formula MO-Z-OM in the presence of hexaethylguanidinium chloride, to form the polyetherimide comprising the structural units of formula (1) as described above, wherein HEGCl is in contact with the bis(halopthalimide) before the polymerization starts for a time and temperature selected from: less than 60 minutes at 180° C.; less than 180 minutes when reacting the halophthalic anhydride with the diorganic amine at temperature of less than 170° C.; less than 20 hours when reacting the halophthalic anhydride with the diorganic amine at temperature of 130° C. to 160° C.; wherein the polyetherimide has a Yellowness Index of less than 93.

Embodiment 17

A method for the manufacture of a polyetherimide, the method comprising (a) reacting a halophthalic anhydride of formula (1) and containing less than 0.02% of residual halophthalide, preferably chlorophthalides with an organic diamine having the formula $H_2N$—R—$NH_2$ to provide a solution wherein the molar ratio of the halophthalic anhydride to the organic diamine is 2:1 to 2.1:1; degassing the solution with an inert gas; and heating the solution to a temperature of less than 180° to form a bis(halophthalimide) of formula (9); and (b) contacting the bis(halophthalimide) with an alkali metal salt of a dihydroxy aromatic compound having the formula MO-Z-OM in the presence of hexaethylguanidinium chloride catalyst, wherein hexaethylguanidinium chloride is in contact with the bis(halopthalimide) before the polymerization starts for a time and temperature selected from: less than 60 minutes at 180° C.; less than 180 minutes when reacting the halophthalic anhydride with the diorganic amine at temperature of less than 170° C.; less than 20 hours when reacting the halophthalic anhydride with the diorganic amine at temperature of 130° C. to 160° C.; to form the polyetherimide comprising the structural units of formula (1) as described above, wherein the polyetherimide has a Yellowness Index of less than 93.

Embodiment 18

A method for the manufacture of a polyetherimide, the method comprising (a) reacting a halophthalic anhydride of formula (1) with an organic diamine having the formula $H_2N$—R—$NH_2$ at a temperature of less than 180° C. to form a bis(halophthalimide) of formula (9); and (b) contacting the bis(halophthalimide) with an alkali metal salt of a dihydroxy aromatic compound having the formula MO-Z-OM, and after the addition of the alkali metal salt is complete forming a polymerizable mixture, (c) adding HEGCl catalyst to the polymerizable mixture to form the polyetherimide comprising the structural units of formula (1) as described above, wherein the polyetherimide has a Yellowness Index of less than 93.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges directed to the same component or property are inclusive of the endpoint and independently combinable. All molecular weights refer to weight average molecular weights unless indicated otherwise. All molecular weights are expressed in Daltons.

The terms "a" and "an" do not denote a limitation of quantity, but rather denote the presence of at least one of the referenced item. "Or" means "and/or." As used herein, "combination thereof" is inclusive of one or more of the recited elements, optionally together with a like element not recited. Reference throughout the specification to "an embodiment," "some embodiments," and so forth, means that a particular element (e.g., feature, structure, property, and/or characteristic) described in connection with the embodiment is included in at least one embodiment described herein, and may or may not be present in other embodiments.

Compounds are described using standard nomenclature. Any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. When the substituent is oxo (i.e., =O), then two hydrogens on the atom are replaced. Combinations of substituents and/or variables are permissible provided that the substitutions do not significantly adversely affect synthesis or use of the compound. The term "substituted" means that at least one hydrogen on the designated atom or group is replaced with another group, provided that the designated atom's normal valence is not exceeded. Groups that can be present on a "substituted" position are cyano, hydroxyl, halogen, nitro, alkanoyl (such as a $C_{2-6}$ alkanoyl group such as acyl), carboxamido, $C_{1-8}$ or $C_{1-3}$ alkyl, $C_{3-8}$ cycloalkyl, $C_{2-8}$ alkenyl, $C_{2-38}$ alkynyl, $C_{1-6}$ or $C_{1-3}$ alkoxy, $C_{6-10}$ aryloxy such as phenoxy, $C_{1-6}$ alkylthio, $C_{1-6}$ or $C_{1-3}$ alkylsulfinyl, $C_{1-6}$ or $C_{1-3}$ alkylsulfonyl, $C_{6-12}$ aryl, $C_{7-19}$ arylalkylene having 1 to 3 separate or fused rings and 6 to 12 ring carbon atoms; or arylalkoxy having 1 to 3 separate or fused rings and 6 to 18 ring carbon atoms, with benzyloxy being an exemplary arylalkoxy.

All ASTM tests are based on the 2003 edition of the Annual Book of ASTM Standards unless otherwise indicated. All cited patents, patent applications, and other references are incorporated herein by reference in their entirety.

While the invention has been described with reference to specific embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for the manufacture of a polyetherimide, the method comprising reacting a halophthalic anhydride having the formula

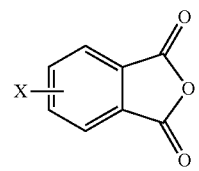

with an organic diamine having the formula

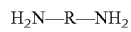

at a temperature of 130 to 160° C. to form a bis(halophthalimide) having the formula

and contacting the bis(halophthalimide) with an alkali metal salt of a dihydroxy aromatic compound having the formula

to form the polyetherimide comprising structural units having the formula

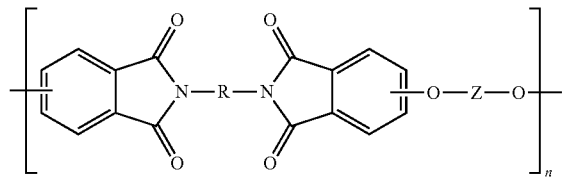

wherein in the foregoing formulae

X is fluoro, chloro, bromo, iodo, or a combination thereof;

wherein each R is independently the same or different, and is a substituted or unsubstituted $C_{6-20}$ aromatic hydrocarbon group, a substituted or unsubstituted straight or branched chain $C_{2-20}$ alkylene group, a substituted or unsubstituted $C_{3-8}$ cycloalkylene group, or a combination thereof;

M is an alkali metal;

Z is an aromatic $C_{6-24}$ monocyclic or polycyclic moiety optionally substituted with 1 to 6 $C_{1-8}$ alkyl groups, 1 to 8 halogen atoms, or a combination thereof; and n is an integer greater than 1;

wherein the polyetherimide has a Yellowness Index of less than 85, wherein the halophthalic anhydride contains less than 0.02% of residual halophthalide.

2. The method of claim 1, wherein the composition comprising the bis(halophthalimide) comprises less than 0.02% of halophthalide.

3. The method of claim 1, further comprising combining the halophthalic anhydride with the organic diamine at a temperature of 18° C. to 25° C. to provide a reaction mixture;

degassing the solution with an inert gas; and
heating the solution to a temperature of 130 to 160° C.

4. The method of claim 1, wherein less than 0.75% of hexaethyl guanidinium chloride is added to the bis(halopthalimide) after it is formed.

5. The method of claim 4, wherein hexaethylguanidinium chloride is in contact with the bis(halophthalimide) for less than 60 minutes at 180° C., before the polymerization starts; or
less than 180 minutes when reacting the halophthalic anhydride with the diorganic amine at temperature of less than 170° C.; or
less than 20 hours when reacting the halophthalic anhydride with the diorganic amine at temperature of 130° C. to 160° C.

6. The method of claim 1, wherein the molar ratio of the halophthalic anhydride to the organic diamine is 2:1 to 2.04:1.

7. A method for the manufacture of a polyetherimide, the method comprising
contacting a halophthalic anhydride having the formula

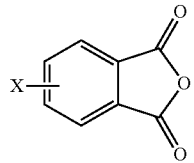

and which contains less than 0.02% of residual halophthalide; with an organic diamine having the formula

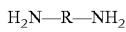

to provide an imidization composition comprising the halophthalic anhydride and the organic diamine, the imidization composition comprising less than 0.75% of hexaethyl guanidinium chloride and less than 0.02% of residual halophthalide;
reacting the imidization composition to form a bis(halophthalimide) having the formula

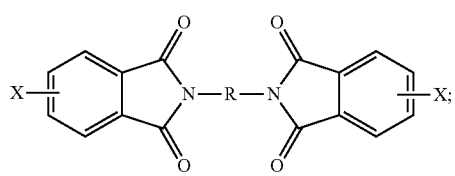

and
contacting the bis(halophthalimide) with an alkali metal salt of a dihydroxy aromatic compound having the formula

to form the polyetherimide comprising the structural units having the formula

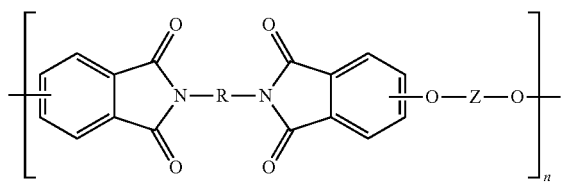

wherein in the foregoing formulae
X is fluoro, chloro, bromo, iodo, or a combination thereof;
each R is independently the same or different, and is a substituted or unsubstituted $C_{6-20}$ aromatic hydrocarbon group, a substituted or unsubstituted straight or branched chain $C_{2-20}$ alkylene group, a substituted or unsubstituted $C_{3-8}$ cycloalkylene group, or a combination thereof;
M is an alkali metal;
Z is an aromatic $C_{6-24}$ monocyclic or polycyclic moiety optionally substituted with 1 to 6 $C_{1-8}$ alkyl groups, 1 to 8 halogen atoms, or a combination thereof; and
n is an integer greater than 1;
wherein the polyetherimide has a Yellowness Index of less than 85.

8. The method of claim 7, comprising reacting the halophthalic anhydride with the organic diamine at a temperature of less than 170° C.

9. The method of claim 7, wherein the molar ratio of the halophthalic anhydride to the organic diamine is 2:1 to 2.04:1.

10. The method of claim 7, wherein less than 0.75% of hexaethyl guanidinium chloride is added to the bis(halopthalimide) after it is formed.

11. The method of claim 10, wherein hexaethylguanidinium chloride is in contact with the bis(halophthalimide) for less than 60 minutes at 180° C., before the polymerization starts; or
less than 180 minutes when reacting the halophthalic anhydride with the diorganic amine at temperature of less than 170° C.; or
less than 20 hours when reacting the halophthalic anhydride with the diorganic amine at temperature of 130° C. to 160° C.

12. A method for the manufacture of a polyetherimide composition, the method comprising
contacting a halophthalic anhydride having the formula

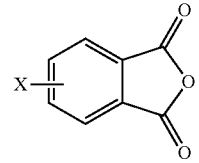

with an organic diamine having the formula

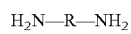

at a temperature of 130 to 160° C. to form a bis(halophthalimide) having the formula

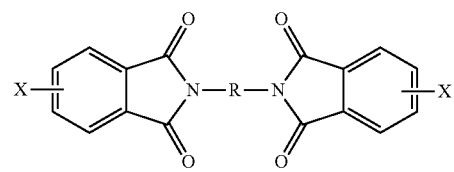

wherein the molar ratio of the halophthalic anhydride relative to the organic diamine is 2:1 to 2.02:1; and
contacting the bis(halophthalimide) with an alkali metal salt of a dihydroxy aromatic compound having the formula

to form the polyetherimide comprising the structural units having the formula

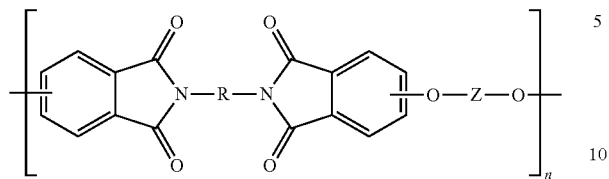

wherein in the foregoing formulae
X is fluoro, chloro, bromo, iodo, or a combination thereof;
each R is independently the same or different, and is a substituted or unsubstituted $C_6$-20 aromatic hydrocarbon group, a substituted or unsubstituted straight or branched chain $C_{2-20}$ alkylene group, a substituted or unsubstituted $C_{3-8}$ cycloalkylene group, or a combination thereof;
M is an alkali metal;
Z is an aromatic $C_{6-24}$ monocyclic or polycyclic moiety optionally substituted with 1 to 6 $C_{1-8}$ alkyl groups, 1 to 8 halogen atoms, or a combination thereof; and
n is an integer greater than 1;
wherein the polyetherimide has a Yellowness Index of less than 85, wherein the halophthalic anhydride contains less than 0.02% of residual halophthalide.

* * * * *